No. 751,131. Patented February 2, 1904.

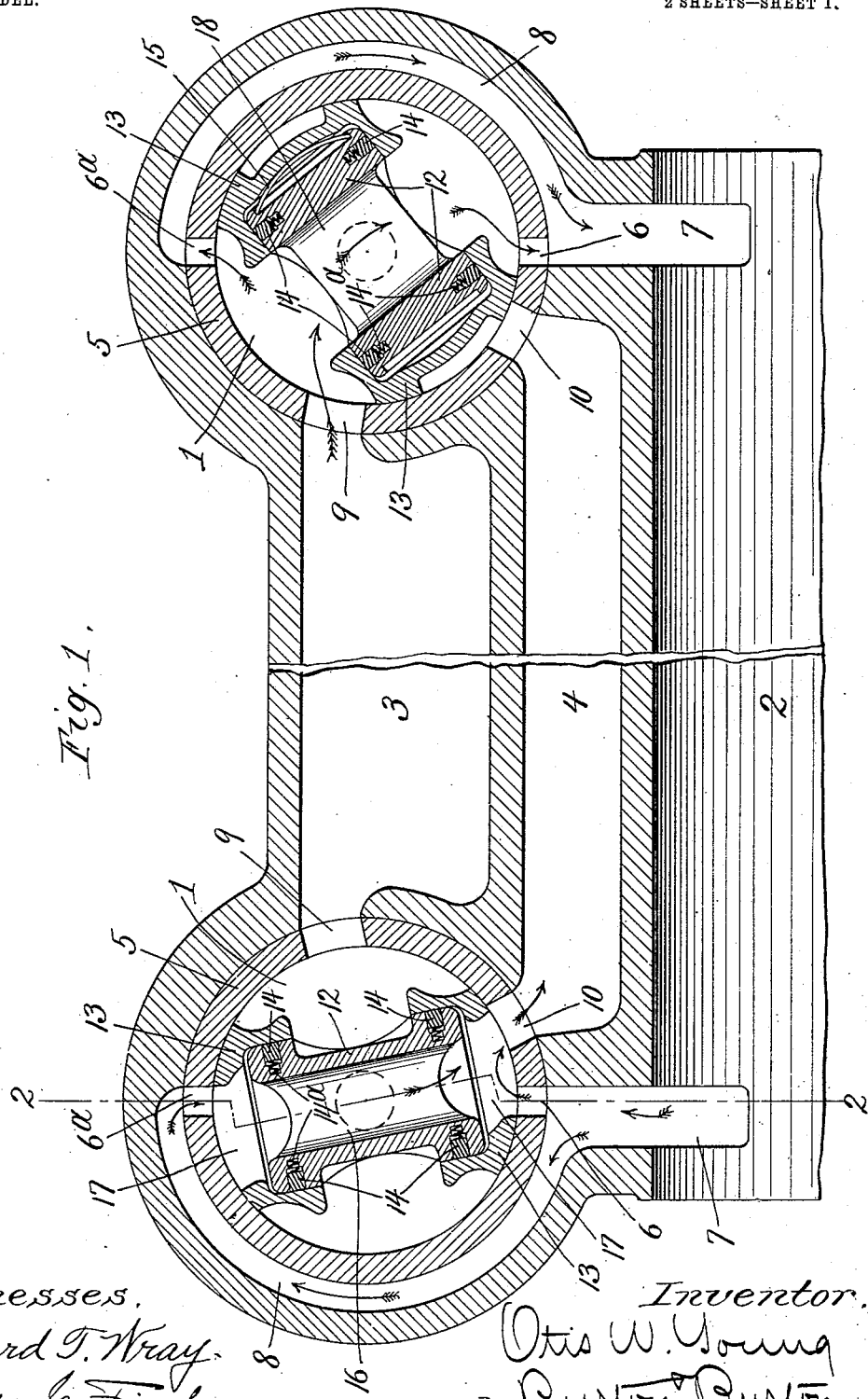

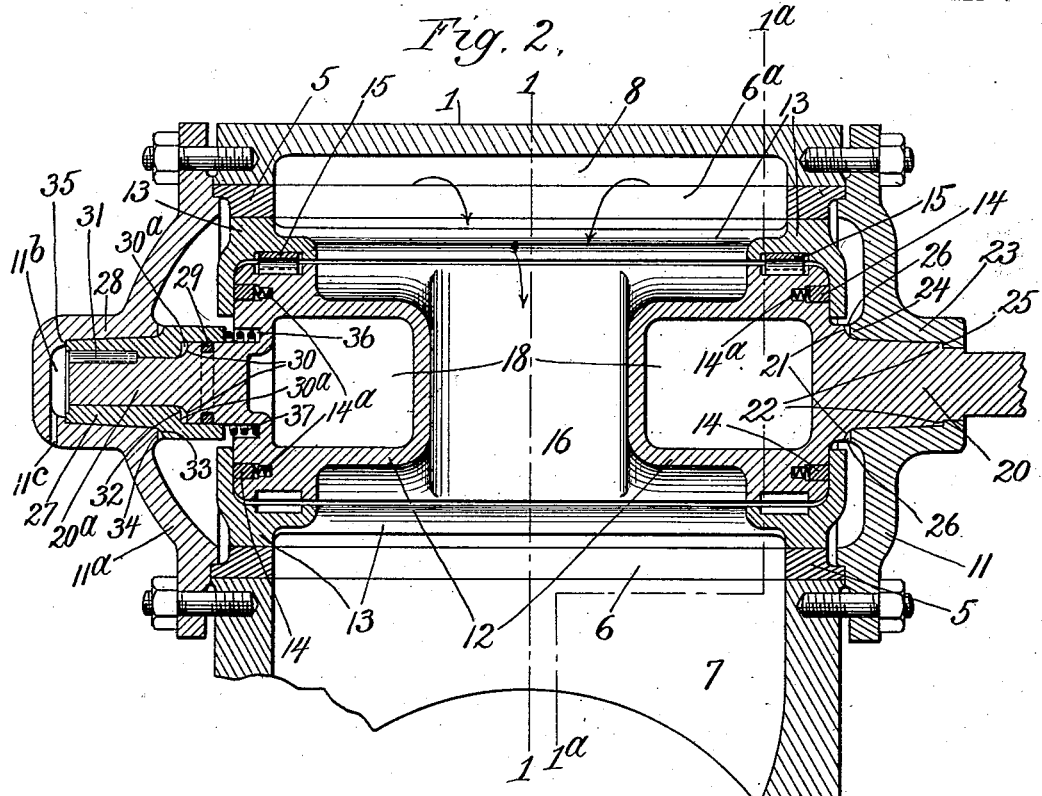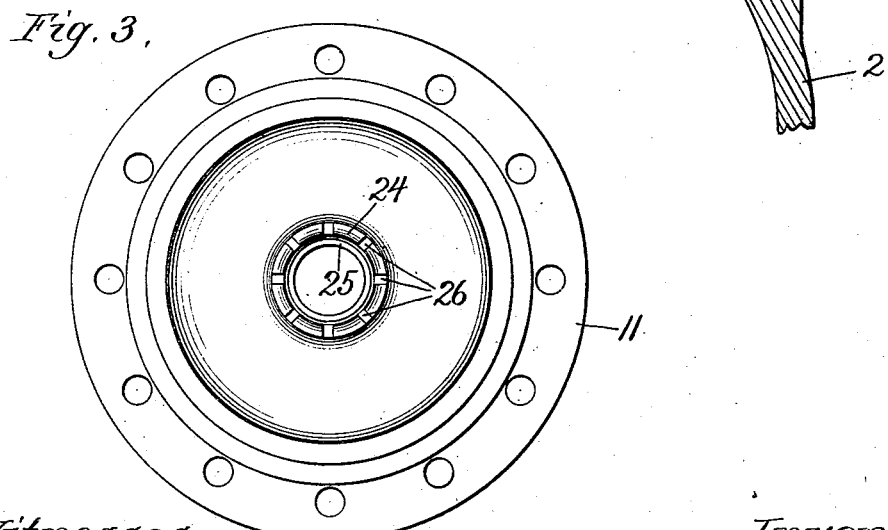

UNITED STATES PATENT OFFICE.

OTIS W. YOUNG, OF CHICAGO, ILLINOIS, ASSIGNOR OF ONE-HALF TO ORVILLE C. MANN, OF OAKPARK, ILLINOIS.

STEAM-ENGINE VALVE.

SPECIFICATION forming part of Letters Patent No. 751,131, dated February 2, 1904.

Application filed April 1, 1903. Serial No. 150,562. (No model.)

*To all whom it may concern:*

Be it known that I, OTIS W. YOUNG, a citizen of the United States, residing at No. 6005 Prairie avenue, in the city of Chicago, in the county of Cook and State of Illinois, have invented new and useful Improvements in Steam-Engine Valves, of which the following is a specification, reference being had to the accompanying drawings, forming a part thereof.

The purpose of this invention is to produce in a valve of the so-called "Corliss" type having a rocking movement a more perfect balance of the valve to reduce its friction on its seat and also in such a valve to secure the greatest practicable area of port-opening for both inlet and outlet with a given comparatively short valve travel.

The invention consists in the features of construction, which are set out in the claims.

In the drawings, Figure 1 is a section longitudinal with respect to the cylinder and transverse with respect to the valves at the planes indicated by the lines 1 1 and $1^a$ $1^a$, respectively, on Fig. 2. Fig. 2 is a section at the line 2 2 on Fig. 1. Fig. 3 is an end elevation of the valve-chamber, showing the valve therein with the cap-plate removed.

The valve-chambers 1 1 extend transversely to the cylinder 2 at the opposite ends of the latter, being formed in an integral casting which contains also the steam chest or reservoir 3 and the exhaust-passage 4, which is intermediate the steam-reservoir and the cylinder. The cylindrical cavity formed for the valve-chamber is bored out and lined with a metal bushing 5, which forms the valve-seats and constitutes the means for dividing live from exhaust steam and separating the various passages. Through the bushing 5 are formed diametrically opposite ports 6 and $6^a$, the former at the side toward the cylinder and leading directly to the port 7 thereof and the latter at the side remote from the cylinder and leading by way of the passage 8 to the same port 7, said passage 8 being formed, primarily, as a groove or recess in the cylindrical cavity in which the bushing 5 is inserted, so that the insertion of the bushing converts said groove into a duct separated by the bushing from the valve-chamber proper, which is the interior cavity of the bushing. Through the bushing 5 there are also formed ports 9 and 10, the former leading from the steam chest or reservoir 3 and the latter leading into the exhaust-passage 4. To the opposite ends of the bushing 5 there are secured heads 11 $11^a$, which afford journal-bearings for the spindles or stems of the valve-carrier 12. The construction of these spindles and their fitting in their respective seats will be hereinafter explained. The carrier is oblong in cross-section, having its longer dimension extending between the two valves 13 13 telescoped onto it, embracing the carrier ends, so as to be carried by it in an oscillating action which the carrier receives from any suitable valve-gear. Packing-strips 14 14 14 14, lodged in longitudinal grooves of the carrier, seated initially by springs $14^a$ and ultimately by the steam which enters behind them, prevent the steam passing through the telescope-joints between the carrier and the valves. The valves may be held initially seated by a spring 15, interposed between the carrier and the valve, as seen in Fig. 1, whenever the position in which the engine is operated makes it necessary thus to support either valve against the action of gravity. When the engine is used with the cylinder horizontal, as in the drawings, only the upper valve need be thus supported, as illustrated. The carrier has the aperture 16, extending from valve to valve and opening into the exhaust-aperture 17 of each valve, thus affording a path by which a portion of the exhaust passing through the passage 8 may reach the exhaust-port 10, and so giving double opportunity for the escape of the exhaust-steam without increasing the width of the exhaust-ports or the distance of valve travel necessary to cover and uncover them. In a direction transverse to the aperture 16 the carrier has two apertures 18 18 at opposite sides of the aperture 16, making communication between the two portions of the valve-chamber which are otherwise separated by the valves and carrier, so that the live steam entering through the port 9 may reach the cylinder by the ports 6 and $6^a$ through the bushing 5 with the same advantage as that above noted in respect to the double port for the passage of the steam without increasing the port area or valve travel. The spindle 20 at the end of the carrier protrudes through its bearing in the head 11 in order that it may be furnished with means for oscillating the valve. This means is not shown. It may be such as shown in my pending application, Serial No. 70,511, dated August 1, 1901, or any other mechanism suitable to produce the required movement.

The spindle 20 is reduced at two shoulders 21 and 22, being also reduced by slight taper between the two shoulders. The journal-bearing 23, provided for the spindle in the head 11, has at the inner end a shoulder 24, corresponding to the shoulder 21 on the spindle and against which said shoulder on the spindle seats, and said bearing has also a shoulder 25 near the outer end, on which the shoulder 22 of the spindle seats. Between said shoulders 24 and 25 the bearing is tapered to correspond to the taper of the spindle between its shoulders. The distance between the shoulders 24 and 25 of the bearing is such with respect to the shoulders 21 and 22 of the spindle that any end thrust of the spindle will seat the shoulders 25 and 22 steam-tight, while the shoulders 24 and 21 are seated with less pressure, the difference in the distance between the seats on the bearing and the seats on the spindle being only such that a slight wearing or extra pressure on the outer shoulders 22 and 25 is necessary to seat the inner ones, and the shoulders 24 on the bearing have the radial grooves 26, admitting steam past the shoulders, which, however, is stopped by the steam-tight seating of the shoulders 22 and 25. At the other end of the carrier the spindle 20$^a$ is reduced sufficiently to adapt it to receive the sleeve 27, whose outward dimensions are substantially the same as those of the spindle 20, and this sleeve forms the immediate bearing of the carrier at this end for its rocking movement, said sleeve being substantially a lining of the journal-bearing 28 of the cap 11$^a$, which is closed at the end, but recessed at 11$^b$ to expose the end of the spindle over an area equal to the cross-section of the spindle 20, which protrudes through the opposite bearing to receive the operating devices. From this recess 11$^b$ a duct 11$^c$ leads outward and admits atmospheric pressure over said area of the end of the spindle. The spindle 20$^a$ has packing-rings 29 sprung into suitable grooves in the spindle near the base of the latter, designed and adapted to effectually pack the bearing of the sleeve thereon to prevent the passage of steam. Beyond the packing-rings the spindle is reduced to form a shoulder 30, from which to the end of the spindle the latter is cylindrical without taper, and the sleeve is correspondingly formed to slide on said cylindrical portion, a slight distance being allowed for play between the exterior shoulder 30 of the spindle and the corresponding exterior shoulder 32 of the sleeve. A feather 31 retains the sleeve and spindle together for rotation with the capacity for longitudinal movement, for which provision is made by the location of the shoulders 30 and 32. The sleeve has an exterior shoulder 33, seated on a shoulder 34 of the cap, which corresponds to the shoulder 24 of the other cap. This shoulder 34 is also radially grooved. The end of the sleeve seats on a shoulder 35, which is related to the shoulder 34 in the same manner as the shoulder 22 is related to the shoulder 25 at the other end—that is, so that a steam-tight joint is formed at the outer of the two pairs of shoulders by the time the inner pair come into contact. A recess 36 is preferably formed in the carrier around the base of the spindle 20$^a$, in which is lodged a spring 37, reacting between the carrier and the sleeve to force the latter initially outward for seating it. The inner diameter of the sleeve at the inner end is substantially equal to the outer diameter at the outer end and equal also to the outer diameter of the shoulder 25 at the opposite end of the carrier, and the outer diameter of the sleeve at the inner end is substantially equal to the outer diameter of the shoulders 24 and 34, which are equal. Upon the sleeve it will be seen that the steam-pressure, tending to seat it outward against the shoulder 35, operates over the annular area of the inner end of the sleeve and is counterbalanced slightly to the extent of the area of the slots in the shoulder 34 and to the slight extent that steam may obtain access to the tapering seat of the sleeve on the cap between said shoulder and the outer end, while atmospheric pressure, gaining access through the cylindrical seat of the spindle in the sleeve between the shoulder 32 and the end, will operate over the area of the annular shoulder 32, counterbalanced by the portion of the annular area of the outer end of the sleeve whose outer diameter is that of the recess 11$^b$. The excess of atmospheric pressure outward tending to seat the sleeve at the shoulder 35 may approximately counterbalance the steam-pressure operating inward at the slots in the shoulder 34 and on the tapering seat, as above mentioned, so that practically the sleeve will be seated outward against the shoulder 35, with the pressure of the steam over the area of the inner annular end of the sleeve. The construction and relation of the shoulders 25 and 24 at one end and 35 and 34 at the other end is designed to afford for the purpose of taking the end thrust a bearing of greater area than that at which the steam-tight seating is made. The initial pressure and the slightest wear upon the outer shoulders at which the steam is designed to be positively cut off will bring the inner shoulders of greater area into bearing which will sustain the end thrust, so the limited area of the shoulders at which the steam-tight junction is initially made will not operate disadvantageously by reason of any undue tendency to cut away those shoulders. The diameter of the spindle 20$^a$ at the base is the same as the diameter of the spindle 20 at the smaller end of the tapered portion—to wit, the outer circumference of the shoulder 22—and steam-pressure is therefore operative on the carrier to thrust the spindle outward and seat it at the shoulder 25 over an annular area which is the difference between a circle whose diameter is the outer diameter of the shoulder 22 and one whose diameter is that of the spindle 20$^a$ at the base, less, however, the area to which the steam obtains access at the slots in the shoulder 22 and in some instances slightly at the tapering seat of the spindle in the cap. Atmospheric pressure operates on the carrier at the area of the reduced end of the spindle 20$^a$, tending to seat the other spindle at the shoulder 25; but this is overbalanced by the atmospheric pressure operating over the area of a circle whose diameter is the inner diameter of the shoulder 25. This slight excess of atmospheric pressure operates against the excess of steam-pressure, so that the outward thrust of the spindle 20 is less than the pressure of the steam over an annular area equal to that of the inner end of the sleeve by the amount of two deductions: first, steam-pressure operating at the slots and on the tapered seat in the cap 11 and the slight excess of atmospheric pressure operating on the spindle 20 over that which operates on the spindle 20$^a$. The end thrust, therefore, of both the sleeve at one end and the spindle 20 at the other is reduced to a very small amount, so that the rocking action of the carrier with its valve is performed with the least possible disadvantage on account of the end thrust. The interposition of the sleeve about the spindle 20$^a$, it will be observed, serves the purpose of permitting the packing, which would otherwise have to be substantially in the form of a stuffing-box on the journal-bearing formed in the cap, to be in the form of packing-rings which are not interposed between surfaces having relative rotation, but only between surfaces which have at most a slight relative sliding movement, and, in fact, have such sliding movement only when the parts come to their seats upon the admission of steam and as wear or expansion and contraction will permit movement to the extent of such changes.

I claim—

1. In an engine, a valve-chamber having an exhaust-port and two cylinder-ports for communicating with the same end of the cylinder; a valve-carrier and two valves thereon similarly related to the two cylinder-ports respectively to perform the same opening and closing movements for both said ports simultaneously, one of the valves having in its face a passage for exhaust adapted to connect the cylinder-port which the valve controls with the exhaust-port, said valves and carrier having a passage opening through the valve-faces respectively and leading to said passage in the last-mentioned valve.

2. In an engine, a valve-chamber having inlet and exhaust ports and having also two ports communicating with the same end of the cylinder; a valve-carrier and two valves thereon separating the inlet and exhaust ports and similarly related to the other two ports respectively to perform the same opening and closing movements for both said ports simultaneously, one of said valves having in its face a passage for exhaust, adapted to connect the cylinder-port which the valve controls with the exhaust-port, said carrier and valves having a passage connecting the valve-faces and leading into said exhaust-passage in the last-mentioned valve.

3. In an engine, a valve-chamber having an inlet and exhaust port and having also two ports for communicating with the same end of the cylinder; a carrier and two valves thereon similarly related to the two ports respectively to perform the same opening and closing movements for both ports simultaneously and operating both as inlet and exhaust valves, the valve-faces being connected by a passage through the valve-carrier, and the carrier being constructed to permit free communication through the chamber from one side to the other thereof between the valves.

4. In an engine, in combination with the cylinder, a valve-carrier oscillating about a vertical axis transverse to the cylinder; oppositely-situated valves on such carrier; a chamber in which the carrier and valves oscillate having two oppositely-situated ports both communicating with the same end of the cylinder, the valves being apertured through their faces respectively to effect communication from one to the other of said ports across the valve-chamber, and means for admitting motive fluid to the valve-chamber at both sides of the carrier between the valves.

5. In an engine, in combination with the cylinder, a valve-chamber transverse thereto having an inlet-port and an exhaust-port, and having proximate to the latter a direct port communicating with the cylinder-port, and having at an opposite position an auxiliary port and a passage therefrom outside the valve-chamber to the cylinder-port; a valve-carrier oscillating in said chamber about an axis transverse to the cylinder; oppositely-situated valves carried thereby, each apertured through its face, the aperture being sufficient to afford communication from said direct port to the exhaust-port, the carrier having an aperture connecting the said valve-apertures and having also an aperture opening at both ends between the valves for admitting the live steam to both sides of the carrier. whereby the said oppositely-situated ports afford two paths both for the exhaust and live steam from and to the cylinder respectively.

6. In an engine, in combination with the cylinder, having at either end a single port for both inlet and exhaust; a valve-chamber transverse to the cylinder having two ports oppositely situated, both communicating with such cylinder-port, and having also an exhaust-port; a pair of valves seating radially with respect to the chamber at opposite positions, and a carrier journaled axially in the chamber, and on which the valves are telescoped, whereby they are adapted to be seated by the steam-pressure in the cylinder, the valves having exhaust-passages in their faces respectively and the carrier having an aperture which connects said exhaust-passages, and means by which the live steam is admitted to the valve-chamber at both sides of the carrier between the oppositely-situated valves.

7. In an engine, in combination with the cylinder, a cylindrical valve-chamber transverse thereto; a valve-carrier journaled at both ends in the heads of said cylinder, and valves radially telescoped on said carrier at opposite positions, the valves having exhaust-passages in their faces respectively, and the carrier having an aperture which connects such exhaust-passages; the chamber having oppositely-situated ports both communicating with the cylinder-port, and means for admitting the live steam to the chamber on both sides of the carrier between the valves.

8. In an engine, in combination with the cylinder, a cylindrical valve-chamber transverse thereto, a carrier journaled axially in such chamber at both ends thereof, and oppositely-situated valves carried by the carrier in its oscillation in the chamber, such chamber having a single inlet for live steam at one side and the valves being shorter than the chamber, whereby the steam reaches both sides of the carrier by passing around the end of the valves in the chamber.

9. In an engine, in combination with the cylinder, a cylindrical valve-chamber transverse thereto having one inlet and one exhaust port and having oppositely-situated ports both communicating with the same end of the cylinder; a carrier journaled axially in such chamber having oppositely-situated valves telescoping onto it radially with respect to the chamber, seating on the cylindrical wall of the chamber; packing in the telescoping joints between the carrier and the valves respectively at planes transverse to the radial thrust of the valves toward their seats respectively, such packing being adapted to be seated outward by the steam-pressure entering behind it, whereby it frictionally retards the radial movement of the valves toward and from their seats.

10. In an engine, in combination with the cylinder, having at either end a single port for both inlet and exhaust, a cylindrical chamber extending transverse thereto, communicating with said cylinder-port and having a groove in its cylindrical wall leading from the communication with the cylinder-port to the opposite wall of said chamber; a steam-chest and exhaust-passages leading into said chamber, bushing lining said chamber having apertures registering with the inlet and exhaust ports and having oppositely-situated apertures communicating with said groove, whereby the groove is cut off from the chamber and forms a passage exterior thereto connecting said oppositely-situated ports; a valve-carrier journaled axially in such chamber and valves carried thereby seating on the interior wall of the bushing, the valves having exhaust-apertures in their faces respectively and the carrier having a passage connecting said exhaust and apertures and having also an aperture admitting the live steam to both sides of the carrier between the valves.

11. In an engine, in combination with the cylinder, a cylindrical valve-chamber transverse thereto having ports communicating with the cylinder and with the steam supply and exhaust passages; a valve-carrier journaled axially in the heads of such chamber, the journals having each an outer and an inner shoulder to transmit the end thrust, and the bearings having corresponding shoulders to receive the thrust, the outer shoulders being of less area than the inner and adapted to be first seated.

12. In an engine, a cylindrical chamber and a valve-carrier journaled axially therein, the journals of such carrier having an inner and an outer shoulder to transmit the end thrust and the journal-bearings having corresponding shoulders to receive such thrusts, said journals and bearings being tapered narrowing from the inner to the outer shoulders and the outer shoulders being of less area than the inner, said shoulders being spaced on the journals and bearings respectively, so that the outer shoulders seat steam-tight before the inner.

13. In an engine, a cylindrical valve-chamber and a valve-carrier journaled axially therein for rotary movement, the journals of such carrier having an outer and an inner shoulder, the outer being of less area than the inner and the journal-bearings having corresponding shoulders to receive the end thrust, the distance between said shoulders on the journals and the bearings being such relatively as to cause the outer shoulders to seat steam-tight before the inner, the latter being transversely grooved to admit steam and oil to the journal-bearing between the shoulders.

14. In an engine, a cylindrical valve-chamber and a valve-carrier journaled axially therein for rotary action, and the valves carried thereby, one of the journals of the carrier being provided with a sleeve feathered on it for rotation therewith and extending into the journal-bearing; packing-rings interposed between such spindle and the sleeve; shoulders on the sleeve and spindle stopped against each other for transmitting the end thrust from the carrier to the sleeve, the sleeve being stopped endwise on the journal-bearing at an annular shoulder, and the remainder of the transverse area of the sleeve and spindle being exposed to atmospheric pressure.

15. In an engine, a cylindrical valve-chamber, a valve-carrier journaled in the heads thereof and having one of its journals protruding to afford means for actuating the carrier; coöperating shoulders on such spindle and its journal-bearings to stop the outward end thrust, the opposite spindle of the carrier having a sleeve telescoped on it similarly stopped in the journal-bearing, the spindle and sleeve having coöperating shoulders for transmitting the end thrust and a packing-ring interposed between the spindle and sleeve back of the last-mentioned shoulders.

In testimony whereof I have hereunto set my hand, in the presence of two witnesses, at Chicago, Illinois, this 21st day of March, A. D. 1903.

OTIS W. YOUNG.

In presence of—
CHAS. S. BURTON,
FREDK. G. FISCHER.